Dec. 14, 1965     I. E. NOWLIN     3,222,762
METHOD OF FORMING VALVE SEAT
Filed Sept. 25, 1961     2 Sheets-Sheet 1
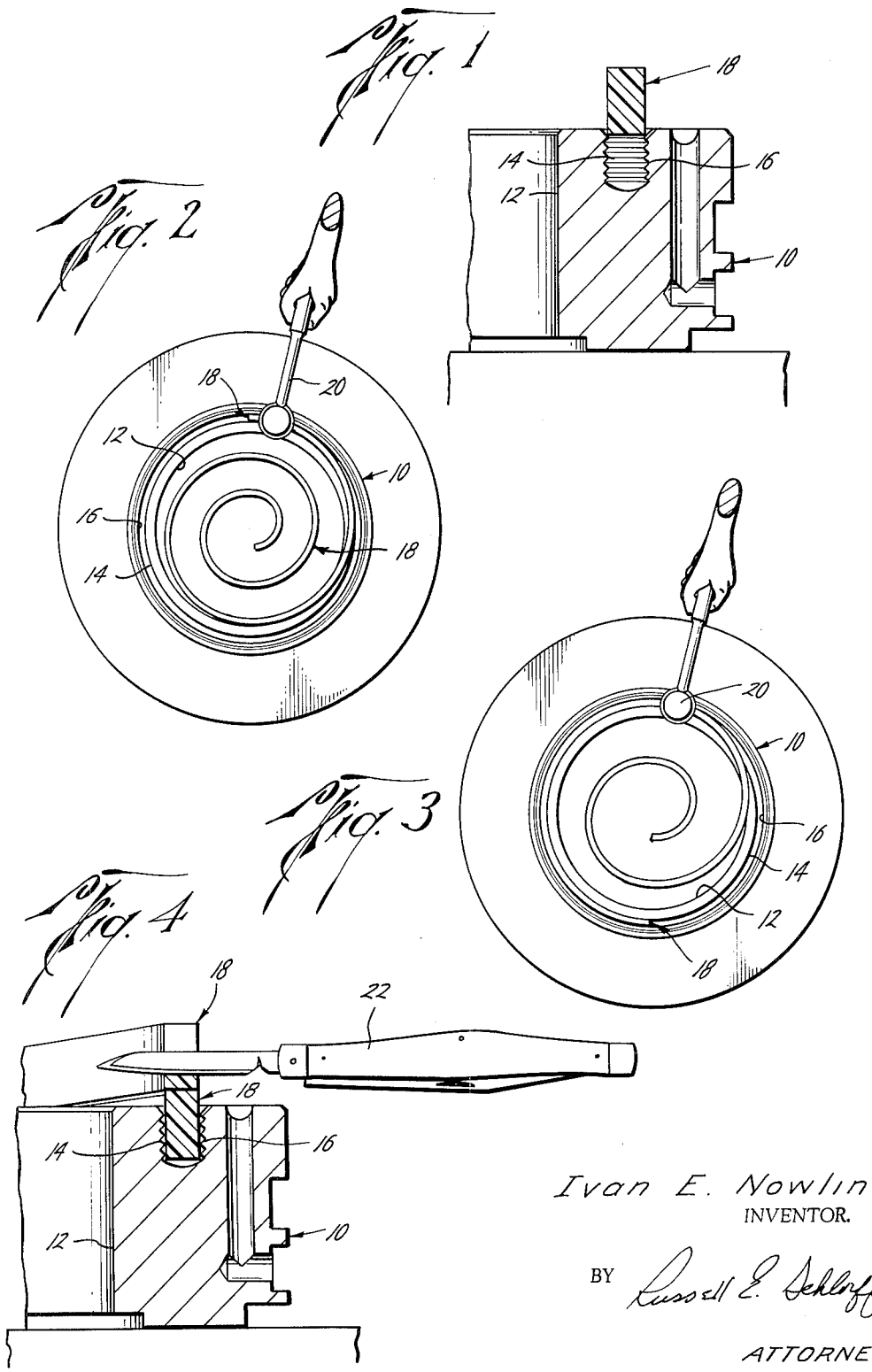
Ivan E. Nowlin
INVENTOR.
BY
ATTORNEY

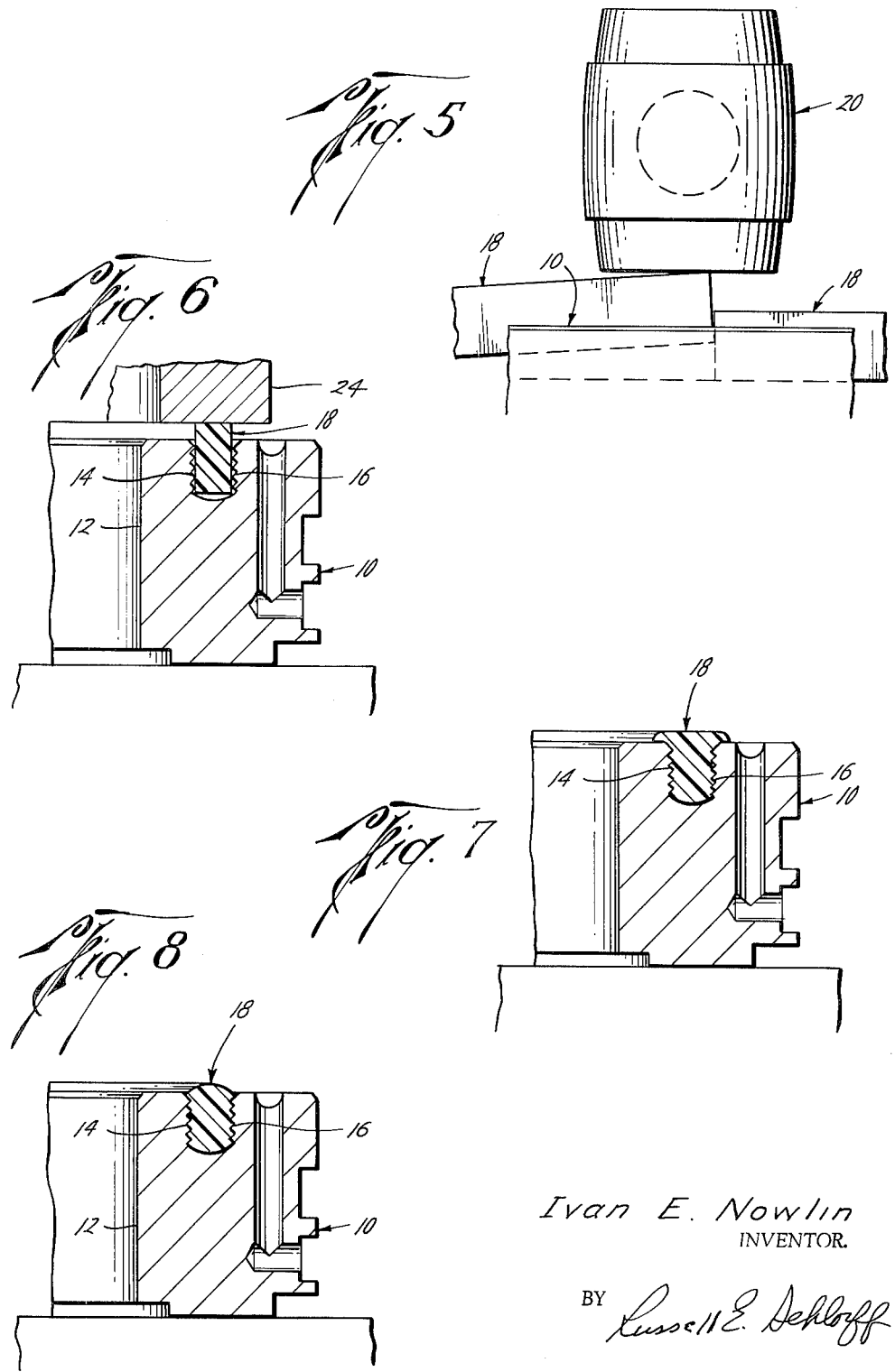

United States Patent Office 3,222,762
Patented Dec. 14, 1965

3,222,762
METHOD OF FORMING VALVE SEAT
Ivan E. Nowlin, Houston, Tex., assignor to ACF Industries Incorporated, New York, N.Y., a corporation of New Jersey
Filed Sept. 25, 1961, Ser. No. 140,418
4 Claims. (Cl. 29—157.1)

This invention relates to a novel method of forming a seat member for valves and more particularly to a novel method of installing a Teflon insert into a valve seat.

Downs et al. United States Patent 2,925,993 discloses a novel valve seat member which utilizes an annular resilient plastic insert. In commercial application, the resilient plastic insert has usually been polytetrafluoroethylene which is commonly referred to throughout industry under its trade-mark name "Teflon" and will be so referred to hereinafter. It is obvious, however, that other materials having deformable properties similar to polytetrafluoroethylene might be employed without departing from the scope of this invention. It was found in actual practice that when a valve utilized a seat of the above-identified patent that the valve would hold fluids, even extremely voluble fluids such as propane and butane, under high pressure without leakage. Whereas, previously valve control of such voluble fluids under high pressure without leakage was accomplished only by augmenting the valve seal with an application of a thick viscous sealant to the sealing surfaces. By utilizing a valve seat incorporating the Teflon insert, the provision of sealant on the sealing surfaces of the valve is unnecessary thereby eliminating possible contamination of line fluid. It has been found that such seats in addition to effecting a bubble-tight resilient seal also produce an effective metal-to-metal seat. Additionally, the use of such seats in gate valves provides an effective wiping action to maintain clean surfaces on the valve members.

While a seat having an annular Teflon insert has many advantages, it is necessary that the annular Teflon insert be positively retained in its groove so as the port of the valve member passes over the insert the unsupported portion of the insert is not blown out.

The annular insert was first utilized in small 2" valves and much research was directed to retaining the insert in the groove. One of the most successful means is that shown in Downs et al. United States Patent 2,925,994 which shows the circumferential walls of the grooves being formed with thread serrations. These thread serrations firmly grip the Teflon insert and retain it in place. Originally, the insert was formed by sintering the Teflon in place. However, the cost of such operation is rather expensive and requires the specialized services of a Teflon fabricator.

Co-pending United States application Serial No. 839,525, now Patent No. 3,087,232, which has a common assignee with the present invention, is directed to a method of installing a preformed Teflon insert by pressure application. However, while the preformed ring of Teflon is fairly inexpensive in the small 2–4" sizes, a preformed annular ring of Teflon in a 10" and larger size becomes rather expensive and in a 36" size almost becomes prohibitive. The present invention is particularly directed to an economical method of inserting and retaining the Teflon insert in a large size valve seat, that is, a seat 10" and larger.

Generally speaking, the method comprises machining a groove in the valve seat and providing the circumferential walls of such groove with a thread serration. The end of an indeterminate length of Teflon strip, which is virtually the same width as the groove and slightly higher than the depth of the groove is inserted in the groove and the strip pushed in place progressively around the groove. When the strip overlaps the beginning, the strip is cut over the initial point of entry. The cut end is then pushed into the groove forming a butt joint with the initial end. It is not necessary that the strip be all the way in the groove nor be uniformly in the groove throughout. All that is required is that the insert is most of the way in the groove throughout. The seat is then inserted in a press and a pressure of sufficient magnitude to cause the material forming the insert to flow and fill the serrations in the circumferential walls of the groove is applied. The application of pressure will seat the Teflon securely in the groove causing the Teflon to flow into the root of the thread serrations and will also cause the ends of the strip to come into intimate contact. After pressure application, the Teflon will protrude slightly above the top of the surface of the seat and will have flowed past the edges of the groove. The seat is then machined to provide the desired extension above the surface of the seat. Although no extraordinary precautions are taken in measuring the length of the strip of Teflon which is inserted into the groove, it will be almost impossible to ascertain the butt joint by visual inspection after machining and tests of the seats reveal that the joint does not leak.

The principal object of the present invention is to provide an economical way of installing Teflon inserts into large valve seats.

It is another object to provide a method of installing a Teflon insert in a large valve seat which will positively retain the insert in the seat.

It is a further object to provide a method by which a Teflon insert may be installed in any size of valve seat without previously forming a specific ring to fit such seat.

It is a further object to provide a method of installing a Teflon insert by utilizing strip Teflon whereby the strip may be inserted in any size seat or diameter groove.

It is a further object to provide a method of forming a valve seat having an insert forming from a strip of Teflon.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specification, wherein:

FIG. 1 is a fragmentary sectional view of a valve seat showing the configuration of the groove and the relationship of the insert prior to installation.

FIG. 2 is a view showing the initial end of the strip insert being installed.

FIG. 3 is a view similar to FIG. 2 illustrating the installation further along on the seat.

FIG. 4 is a view showing the cutting of the strip to form the joint.

FIG. 5 is a view similar to FIG. 4 showing the pushing-in of the end of the strip.

FIG. 6 is a fragmentary sectional view of the seat showing the relationship of the insert to the groove after it has been initially pushed in prior to the ramming of the press which is shown fragmentarily above the seat.

FIG. 7 is a view similar to FIG. 1 showing the flowing of the Teflon into the grooves and the flowing above the face of the seat after it has been pushed in by the press.

FIG. 8 is a fragmentary sectional view of a finished machined seat.

Referring now to the drawings, there is shown in FIG. 1 the cross-section of an annular valve seat 10 which has an annular bore 12. Surrounding the bore 12 is an annular groove 14 which is preferably generally rectangular in radial section. The inner and outer circumferential walls of the groove are provided with screw threads 16. The screw thread 16 may be a sharp V-type thread approximately 1/64" deep with the outer end of the groove 14 provided with a chamfer. If desired, other types of thread serrations such as a buttress type thread may be used. In general, this seat following the teachings of the aforementioned Downs et al. patents.

FIG. 1 shows positioned above the groove 14 a Teflon insert 18 which is rectangular in shape and slightly larger than the nominal dimensions of the groove. It has been found that a ring of Teflon 3/16" in width will provide a good seal. A ring of this size may be used on valves of practically any size and has been found usable in valve seats having a bore diameter of from 6" through 36". It has been found desirable for the Teflon insert to have a depth of approximately 1/4". One particular advantage of the present invention is that the groove can be manufactured with normal machine shop tolerances of plus or minus 1/32". Using a groove as just described, the Teflon insert 18 is formed from a strip of Teflon which is 3/16" in thickness and 5/16" in height. The Teflon strip may be sheared from Teflon sheet material or extruded, and normal Teflon fabricator's tolerances for this material may be used successfully. Again, the present method does not require any special processed material. The Teflon utilized comes in strips of 44 feet in length which is the normal length that the Teflon fabricator produces; however, the strips may be any length conveniently produced. It has been found that Teflon formed of fairly small granular particles makes the best sealing surface.

The method of inserting the Teflon strip 18 into the groove 14 is shown in FIGS. 2–5. FIG. 2 shows an end of the Teflon strip 18 being pushed into the groove 14 with a rawhide mallet 20. The Teflon strip 18 is then progressively pushed into the groove the remainder of the way around the seat as can be seen in FIG. 3. In some instances, depending upon the tolerancing, it may be possible to push the Teflon strip in by hand; in other instances, a light tap of the rawhide mallet 20 will suffice. When the Teflon strip 18 has been inserted around the circumference of the entire groove 14, the strip 18 is placed over the installed end and the Teflon strip 18 is cut with a knife 22 as shown in FIG. 4. The cut should be such that the two ends of Teflon strip will closely abut each other. The cut end of the Teflon strip is then pushed down with a rawhide mallet as seen in FIG. 5 to form a butt joint with the installed end. It is not necessary for the Teflon strip to be of uniform height above the top of the seat throughout. At this stage, the Teflon strip 18 will extend above the seat approximately 1/16" and will not as a rule fill the root of the serrations, see FIG. 6.

The seat 10 is then placed in a press 24 which is capable of delivering sufficient pressure to the Teflon ring 18 to cause the material forming the ring to flow into the serrations 16 and also cause intimate contact of the ends of the strip. It has been found that 20,000 lbs. for each square inch of exposed Teflon works very satisfactorily causing the material to flow without undue fracture of the top surface. The exact load exerted by the press 24 is calculated by determining the amount of Teflon 18 and applying a load of 20,000 lbs. for each square inch of exposed Teflon. The press 24 is lowered and the pressure is held for preferably one minute. This action will cause the Teflon 18 to flow into the serrations 16 interlocking therewith and will also cause the two ends to come into intimate contact. The excessive Teflon will extend slightly above the face of the seat, see FIG. 7. It has been found that after this operation the Teflon usually extends approximately 1/32" above the face of the seat 10. Close examination of the seat will sometimes disclose the location of the joint, however, it will appear as a very thin line.

The next step is to machine the strip to a height of approximately .005" to .008" above the surface of the seat 10, see FIG. 8. After machining, the joint will not be visible through visual inspection and the annular insert 18 will appear on visual inspection to be a continuous ring.

Numerous destructive tests of the seat have shown that the Teflon 18 completely fills the serrations 16 and is completely anchored in place. Attempts to blow out the Teflon have required higher pressures than when the insert is installed by other methods, and no leakage has been found at the joint itself.

The method is extremely simple and can be taught to the average shop employee with a minimum of training. The groove 14 may be machined with ordinary machine shop tolerances and the Teflon strip 18 can be supplied with normal Teflon fabricator tolerances. The method permits a great latitude in shop practices. If at any time it is desired to change the pitch diameter of the groove 14, it can be so changed without affecting the installation of the Teflon insert 18. Virtually no equipment except the hydraulic press 24 is required. By utilization of this method, the cost of seats with Teflon inserts has been substantially reduced. Also, the seats with Teflon inserts can be supplied with rapidity without having to wait for some preformed rings, or forwarding the seats to a fabricator for installation of a molded ring.

What I claim is:

1. The method of forming a valve seat, said method comprising:
   machining an annular groove in the seat and providing the circumferential walls of the groove with thread serrations,
   initially inserting an end of a strip of polytetrafluoroethylene into the groove,
   progressively pushing the strip into the groove until the strip overlaps the installed end,
   cutting the strip approximately above the installed end of the insert,
   pushing the cut end of the insert into the groove forming a butt joint with the installed end,
   applying a load of approximately 20,000 lbs. for each square inch of exposed insert for approximately one minute causing the material forming the insert to flow into and fill the thread serrations in the circumferential walls of the groove and causing the butt joint to establish a fluid-tight seal,
   machining off the excessive amount of insert.

2. The method of installing an insert of deformable sealing material into an annular groove in a valve seat, said groove having its circumferential walls provided with thread serrations, said method comprising:
   initially inserting the end of a strip of deformable sealing material into the groove,
   progressively pushing the insert into the annular groove until the strip overlaps the installed insert,
   cutting the strip approximately above the installed end of the insert,
   pushing the cut end of the insert into the groove forming a butt joint with the initially inserted end,
   applying a pressure of approximately 20,000 p.s.i. for approximately one minute thereby causing the material forming the insert to flow into and fill the thread serrations to lock the insert within the groove and causing the butt joint to establish a fluid-tight seal,
   machining off the excessive amount of insert.

3. The method of installing an insert of deformable sealing material into an annular groove having its circumferential walls provided with thread serrations, said method comprising:
   initially inserting the end of a strip of deformable sealing material into the groove,
   progressively pushing the insert into the groove until the strip overlaps the installed insert,
   cutting the strip approximately above the installed end of the insert, pushing the cut end of the insert into the groove forming a butt joint with the initially inserted end, applying and retaining sufficient pressure to the insert to cause the material forming the insert to flow and fill the thread serrations in the circumferential walls of the groove and causing the butt joint to establish a fluid-tight seal, machining off the excessive amount of insert.

4. The method of forming a valve comprising the steps of:

machining an annular groove in the seat and providing the circumferential walls of the groove with thread serrations, inserting one end of a strip of sealing material of predetermined length into the groove, progressively inserting the remainder of the strip into the groove until the other end of the strip abuts said one end of said strip forming a butt joint with said one end of said strip, applying and retaining sufficient pressure on said insert for a sufficient duration to cause the sealing material to flow and fill the thread serrations in the circumferential walls of the groove and to cause said butt joint to establish a fluid-tight seal, machining off the excessive amount of said insert.

References Cited by the Examiner
UNITED STATES PATENTS

| | | | |
|---|---|---|---|
| 1,891,932 | 12/1932 | Hunter | 20—56.4 |
| 1,892,104 | 12/1932 | Hunter | 20—56.4 |
| 2,647,556 | 8/1953 | Courtney. | |
| 2,728,976 | 1/1956 | Kraus | 29—157 |
| 3,058,208 | 10/1962 | Haushalter | 29—451 |
| 3,061,269 | 10/1962 | Sinkler. | |
| 3,084,423 | 4/1963 | Fullerton | 29—451 X |
| 3,087,232 | 4/1963 | Dow | 29—157.1 |

WHITMORE A. WILTZ, *Primary Examiner.*

M. CARY NELSON, JOHN F. CAMPBELL, *Examiners.*